United States Patent [19]

Hosoya et al.

[11] Patent Number: 5,459,998
[45] Date of Patent: Oct. 24, 1995

[54] APPARATUS FOR INTRODUCING FRESH AIR INTO EXHAUST PIPE OF INTERNAL COMBUSTION ENGINE FOR PURIFICATION OF EXHAUST GAS

[75] Inventors: Yasuhiko Hosoya; Toshiki Kuroda, both of Himeji; Hideaki Katashiba, Amagasaki, all of Japan

[73] Assignee: Mitsubishi Denki Kabushiki Kaisha, Tokyo, Japan

[21] Appl. No.: 33,676

[22] Filed: Mar. 9, 1993

[30] Foreign Application Priority Data

Mar. 11, 1992 [JP] Japan ................................. 4-052181
Jan. 8, 1993 [JP] Japan ................................. 5-002097

[51] Int. Cl.⁶ ........................................... F01N 3/22
[52] U.S. Cl. ........................... 60/284; 60/289; 60/290
[58] Field of Search .......................... 60/284, 289, 290

[56] References Cited

U.S. PATENT DOCUMENTS

| | | | |
|---|---|---|---|
| 3,034,290 | 5/1962 | Gary | 60/289 |
| 3,220,805 | 11/1965 | Fowler et al. | |
| 3,338,682 | 8/1967 | Fowler | 60/289 |
| 3,503,716 | 3/1970 | Berger | 60/284 |
| 3,747,346 | 7/1973 | Onoda et al. | 60/286 |
| 3,765,823 | 10/1973 | Kawabata et al. | 431/157 |
| 3,779,015 | 12/1973 | Maruoka | 60/289 |
| 3,785,434 | 1/1974 | Okuma et al. | 165/29 |
| 3,982,397 | 9/1976 | Laurent | 60/290 |
| 4,395,994 | 8/1983 | Goto et al. | 123/549 |
| 4,397,632 | 8/1983 | Iritani et al. | 431/210 |
| 4,712,516 | 12/1987 | Eberhardt | 123/1 A |
| 4,858,861 | 8/1989 | Wilkinson, III | 248/74.1 |
| 4,862,859 | 9/1989 | Yunick | 123/545 |
| 4,879,975 | 11/1989 | Bennett | 123/52 M |
| 5,003,778 | 4/1991 | Erber et al. | 60/517 |
| 5,022,352 | 6/1991 | Osborne et al. | 122/17 |
| 5,055,334 | 10/1991 | Lechuga | 428/99 |
| 5,056,316 | 10/1991 | Chung | 62/3.2 |
| 5,245,933 | 9/1993 | Childs | 110/214 |
| 5,250,268 | 10/1993 | Geiger | 422/174 |

FOREIGN PATENT DOCUMENTS

| | | |
|---|---|---|
| 33956 | 11/1972 | Japan. |
| 62220 | 5/1976 | Japan. |
| 39018 | 3/1977 | Japan. |
| 55-29003 | 3/1980 | Japan. |

OTHER PUBLICATIONS

Patent Abstracts of Japan M-54 Dec. 23, 1977, vol. 1 No. 164, Kokai No. 52-110320, Sep. 16, 1977.

*Primary Examiner*—Douglas Hart
*Attorney, Agent, or Firm*—Sughrue, Mion, Zinn, Macpeak & Seas

[57] ABSTRACT

An apparatus for introducing fresh air into an exhaust pipe of an internal combustion engine for purification of exhaust gas includes an air introducing means disposed between an intake pipe and an exhaust pipe of an internal combustion engine for introducing a fresh air into the exhaust pipe and hence to a catalytic converter, and a heater for heating the fresh air introduced through the air introducing means, wherein the heated air is fed to an catalytic converter via the exhaust pipe. Conversion of noxious components contained in the exhaust gas into harmless components is attained with the enhanced efficiency owing to heating of the fresh air by the heating means.

17 Claims, 8 Drawing Sheets

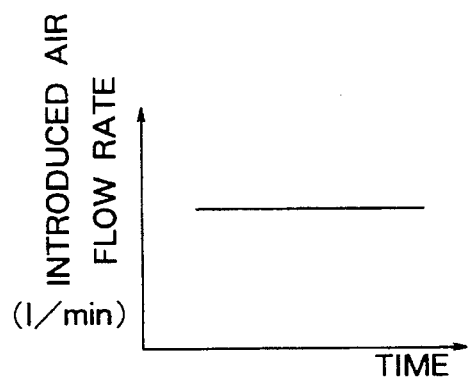
FIG. 3(a)
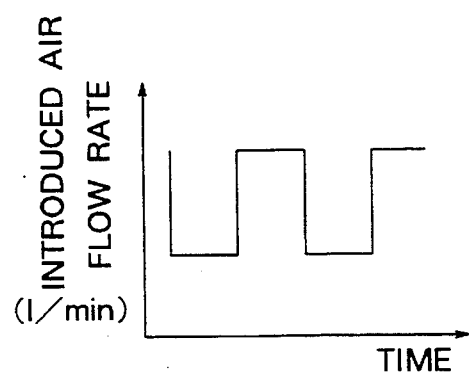
FIG. 3(b)
FIG. 4
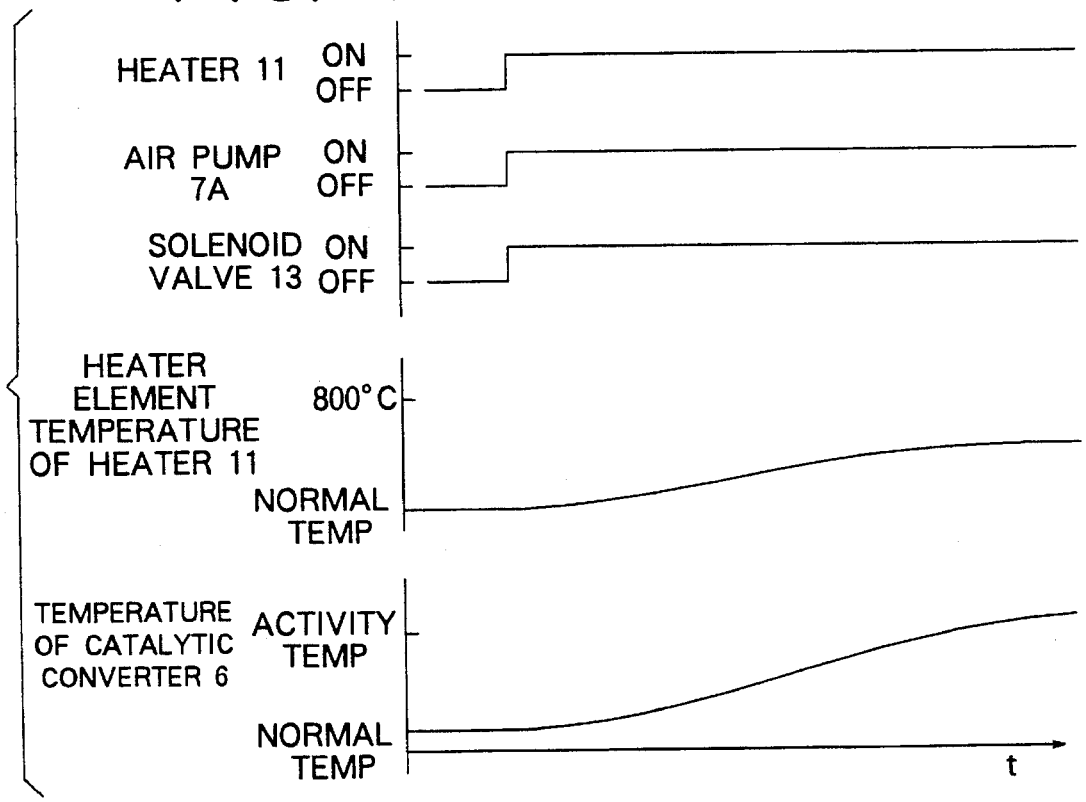

5,459,998

APPARATUS FOR INTRODUCING FRESH AIR INTO EXHAUST PIPE OF INTERNAL COMBUSTION ENGINE FOR PURIFICATION OF EXHAUST GAS

BACKGROUND OF THE INVENTION

1. Field of the Invention

The present invention relates generally to an engine exhaust gas purification apparatus. More particularly, the invention is concerned with an apparatus for introducing fresh air into an exhaust gas pipe of an internal combustion engine while heating sufficiently the air introduced into the exhaust pipe, for the purpose of promoting or accelerating the activity of a catalyst employed for purifying an exhaust gas discharged from the engine.

2. Description of the Related Art

For a better understanding of the present invention, the background of the technique to which the present invention belongs will first be described in some detail. FIG. 11 is a view showing schematically a configuration of an internal combustion engine system which is equipped with an apparatus for introducing fresh air into an exhaust pipe. Referring to the figure, an internal combustion engine (hereinafter also referred to simply as the engine) 1 is provided with an air intake pipe 2 for supplying air into the engine 1, the intake pipe 2 having an inlet port connected to an air cleaner 3 which serves for screening out the dusts or other foreign materials from the air introduced into the intake pipe 2. Mounted within the intake pipe 2 is a throttle valve 4 for adjusting or regulating the flow or volume of the air charged into the engine 1 by adjusting the degree of opening of that valve.

An exhaust pipe 5 connected to the engine 1 serves to transport the exhaust gas discharged from the engine 1 to a catalytic converter 6 which is provided for purifying the exhaust gas through a catalytic chemical reaction. The intake pipe 2 is connected to the exhaust pipe 5 at a location upstream of the catalytic converter 6 by way of a shunt pipe 8 for introducing the fresh air into the exhaust pipe 5 from the intake pipe 2. In this conjunction, an air pump 7 is installed in the fresh air introducing shunt pipe 8 for forcibly feeding the air having passed through the air cleaner 3 into the shunt pipe 8 under a pressure. Disposed in the fresh air introducing pipe 8 at a position downstream of the air pump 7 is a check valve 9 which functions to prevent the exhaust gas from flowing backwardly from the exhaust pipe 5 into the intake pipe 2. A transmission 10 is coupled to an output shaft (not shown) of the engine.

In operation of the engine system of the structure described above, clean air passed through the air cleaner 3 is fed through the intake pipe 2 in an amount or flow adjusted in dependence on the degree of opening of the throttle valve 4 to be charged into the engine together with a fuel jetted from a fuel injector (not shown). An air-fuel mixture thus charged undergoes combustion within the engine cylinder, wherein the combustion energy is converted into kinetic energy for driving the output shaft of the engine. The exhaust gas produced as a result of the combustion is discharged into the exhaust gas pipe 5.

On the other hand, the air pump 7 is driven by a power derived from the output of the engine to compress the air tapped from the intake pipe 2, wherein the air discharged from the air pump 7 is fed to the exhaust pipe 5 and hence to the catalytic converter 6 by way of the fresh air introducing pipe 8 and the check valve 9. Within the catalytic converter 6, the fresh air reacts with noxious components contained in the engine exhaust gas such as hydrocarbon (HC in abbreviation) and carbon monoxide (CO) to thereby make the exhaust gas harmless (detoxication). More specifically, a gas mixture of the fresh air and the exhaust gas fed to the catalytic converter 6 contains noxious components originating in the exhaust gas such as hydrocarbon, monoxide and the like as well as oxygen and others contained in the air introduced through the fresh air introducing pipe 8. The catalytic converter 6 serves to convert above-mentioned noxious components to water ($H_2O$), carbon dioxide ($CO_2$) and other through catalytic chemical reaction, to thereby purify or detoxify the exhaust gas discharged from the engine.

Parenthetically, the amount or flow of the fresh air introduced into the exhaust pipe 5 through the fresh air introducing pipe 8 is maintained substantially constant at a predetermined value, as can be seen from FIG. 12.

The hitherto known apparatus for introducing the fresh air into the exhaust gas pipe of the engine suffers, however from several problems. First, the fresh air introduced into the exhaust pipe via the fresh air introducing shunt pipe is at a relatively low temperature on the order of the normal or ambient temperature. Consequently, activity of oxygen molecules contained in the fresh air as added remains low, which means that the efficiency of reaction of oxygen with the noxious components of the exhaust gas in the catalytic converter is poor, incurring undesirable degradation in the exhaust gas purification efficiency.

Another problem of the fresh air introducing apparatus known heretofore is seen in that the exhaust gas purification efficiency is necessarily limited by the amount of the fresh air as introduced. In this conjunction, the fresh air introduced into the exhaust pipe is maintained substantially constant, as mentioned above. Accordingly, it can not be expected to improve or enhance the exhaust gas purification efficiency over the limit imposed with regard to the amount of the fresh air as added.

SUMMARY OF THE INVENTION

In the light of the state of the art described above, it is therefore an object of the present invention to provide an apparatus for introducing fresh air into an exhaust pipe of an internal combustion engine, which apparatus can essentially avoid the aforementioned problems of the hitherto known apparatus and which can ensure an improved or enhanced exhaust gas purification efficiency.

In view of the above and other objects which will become apparent as description proceeds, it is taught according to the present invention in its broadest sense to heat the air introduced into the exhaust pipe and make adjustable the amount of fresh air introduced into the exhaust pipe, for thereby enhancing the exhaust gas purification efficiency.

Thus, according to an aspect of the present invention, there is provided an apparatus for introducing fresh air into an exhaust pipe of an internal combustion engine, which apparatus comprises an air introducing means connected between an intake pipe and an exhaust pipe of an internal combustion engine for introducing a fresh air into the exhaust pipe, and a heating means for heating the fresh air introduced by the air introducing means, wherein the heated air is fed to an exhaust gas purification means by way of the exhaust pipe.

With the structure of the fresh air introducing apparatus described above or the exhaust gas purification apparatus, to say in another way, oxygen molecules contained in the fresh air flow are activated under heating by the heating means, bringing about a highly efficient and effective reaction with noxious components contained in the exhaust gas, whereby the latter can be purified with an enhanced efficiency.

According to a second aspect of the present invention, there is provided an apparatus for introducing fresh air into an exhaust pipe of an internal combustion engine, which apparatus comprises an air introducing means connected between an intake pipe and an exhaust pipe of an internal combustion engine for introducing a fresh air into the exhaust pipe, a heating means for heating the fresh air introduced by the air introducing means, and a control means for controlling the operation of the heating means, wherein the fresh air is fed to an exhaust gas purification means by way of the exhaust pipe, while being heated under the control of the control means.

With the structure of the apparatus described above, it is possible to operate the heating means only for the shortest time as required for heating the fresh air to a desired temperature from a time point immediately after the start of the engine operation, whereby unnecessary or redundant heating operation can be avoided.

According to yet another aspect of the invention, there is provided an apparatus for introducing air into an exhaust pipe of an internal combustion engine, which apparatus comprises an air introducing means connected between an intake pipe and an exhaust pipe of an internal combustion engine for introducing a fresh air into the exhaust pipe, an air flow adjusting means for adjusting a flow of the fresh air introduced through the air introducing means, a heating means for heating the fresh air introduced by the air introducing means, and a control means for controlling operations of the air flow adjusting means and the heating means, wherein the fresh air is fed to an exhaust gas purification means by way of the exhaust pipe, while being controlled in respect to the heating and the flow rate.

In the fresh air introducing apparatus described above, not only the operation of the heating means but also the amount of air as added is controlled, whereby the exhaust gas purification efficiency can further be enhanced.

According to a further aspect of the invention, there is provided an apparatus for introducing air into an exhaust pipe of an internal combustion engine, which apparatus comprises an air introducing means connected between an intake pipe and an exhaust pipe of an internal combustion engine for introducing a fresh air into the exhaust pipe, an air flow adjusting means for adjusting a flow of the air introduced through the air introducing means, a heating means for heating the fresh air introduced by the air introducing means, and a control means for controlling the heating means and the air flow adjusting means such that the heating means is actuated before starting the operation of the internal combustion engine, which is then followed by actuation of the air flow adjusting means, the heated air being fed to an exhaust gas purification means by way of the exhaust pipe.

With the structure of the apparatus described above, a heater element constituting a part of the heating means can be heated previously before starting the engine operation by the control means, whereby the air introduced into the exhaust pipe through the fresh air introducing means can instantaneously be heated upon starting of the engine operation, making it possible to introduce the fresh air of a high temperature into the exhaust pipe immediately after the start of the engine operation.

The above and other objects, features and attendant advantages of the present invention will more easily be understood by reading the following description of the preferred embodiments thereof taken in conjunction with the drawings.

BRIEF DESCRIPTION OF THE DRAWINGS

FIGS. 3A and 3B are views for graphically illustrating in what manner the flow rate of fresh air introduced into the exhaust pipe of the engine is changed as a function of time according to the teaching of the invention;

FIG. 4 is a timing chart for illustrating control operation of a controller incorporated in the system according to an embodiment of the invention;

DESCRIPTION OF THE PREFERRED EMBODIMENTS

Now, the present invention will be described in detail in conjunction with preferred or exemplary embodiments thereof by reference to the drawings.

Embodiment 1

Figure 1:
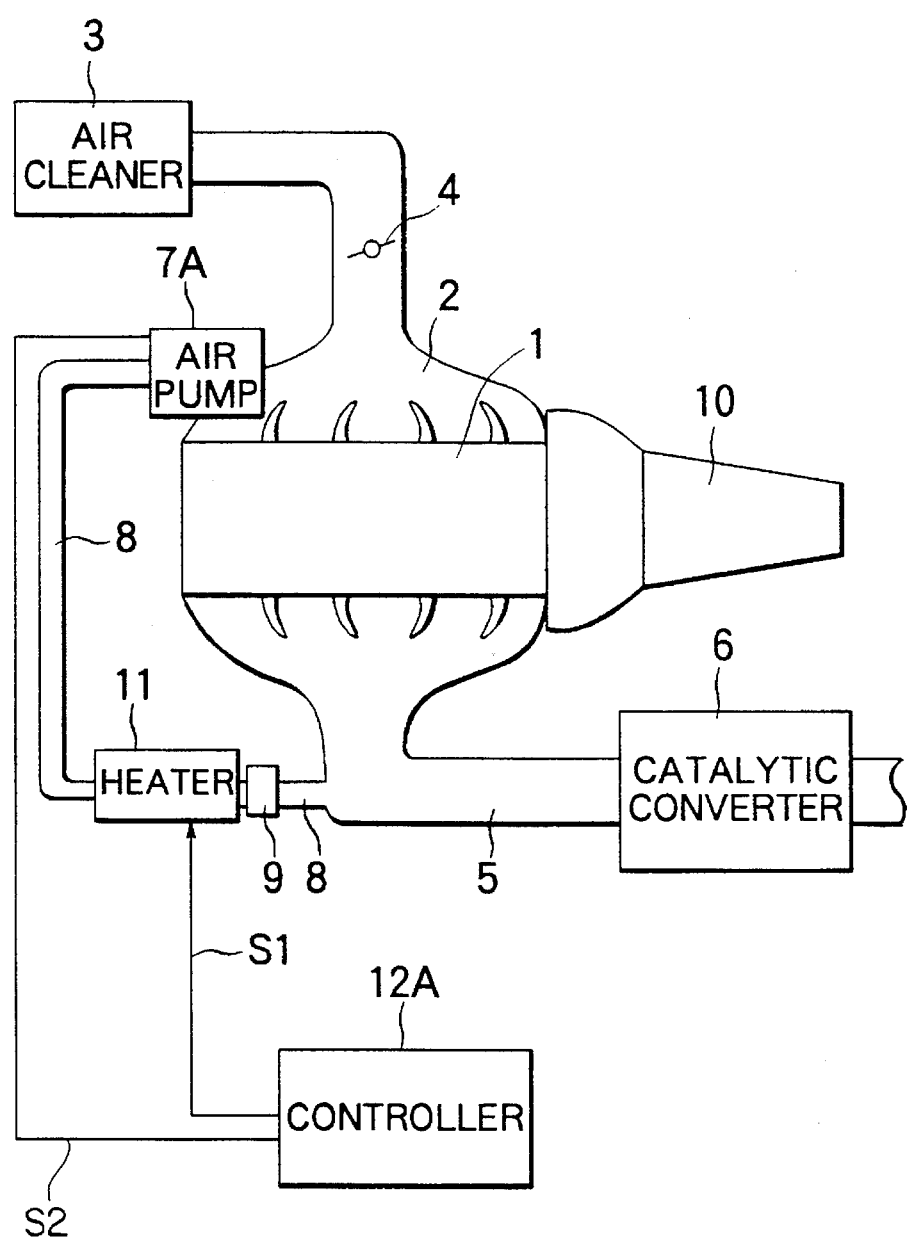
FIG. 1 is a view showing schematically a general arrangement of an internal combustion engine system incorporating an apparatus for introducing fresh air into an exhaust pipe of the engine according to an embodiment of the present invention.
Figure 11:
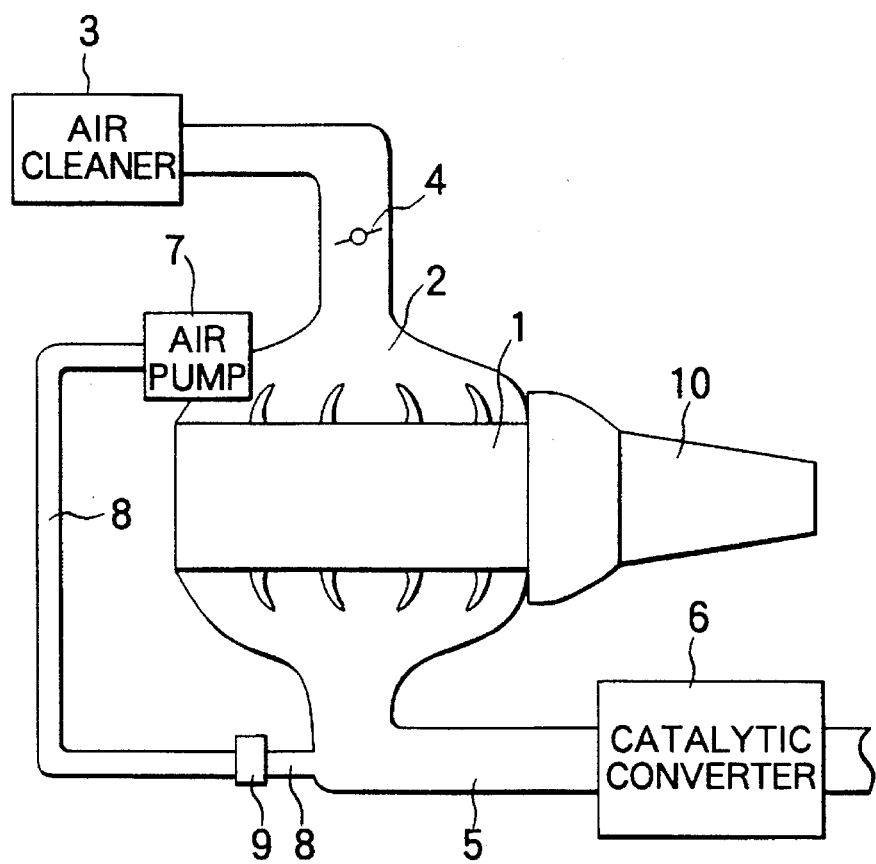
FIG. 11 is a diagram showing an engine system equipped with a hitherto known apparatus for introducing the air into an exhaust pipe of the engine.
Figure 12:
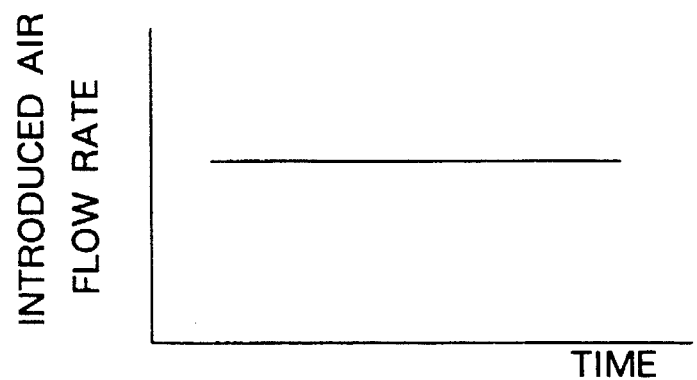
FIG. 12 is a view for graphically illustrating control of the flow rate of air as introduced in the system known heretofore.

FIG. 1 is a view showing schematically a general arrangement of an internal combustion engine system incorporating an apparatus for introducing fresh air into an exhaust pipe of the engine according to an embodiment of the present invention. In this figure, parts which are the same as or equivalent to those described hereinbefore by reference to FIG. 11 are denoted by like reference numerals and repeated description of them is omitted. According to the teaching of the invention in this embodiment, a heater 11 constituting the heating means is disposed in the fresh air introducing pipe 8 at a position located upstream of the check valve 9 as viewed in the direction in which the fresh air flows. Further, a controller 12A constituting the control means is provided for generating on the basis of an engine starter signal (not shown) a variety of control signals inclusive of a heating control signal S1 for actuating the heater 11 and a pump control signal S2 for actuating the air pump 7A. The exhaust gas purification means is constituted by the catalytic converter 6, while the air introducing means is constituted by the fresh air introducing shunt pipe 8 through cooperation with the air pump 7A and the check valve 9.

Figure 8:
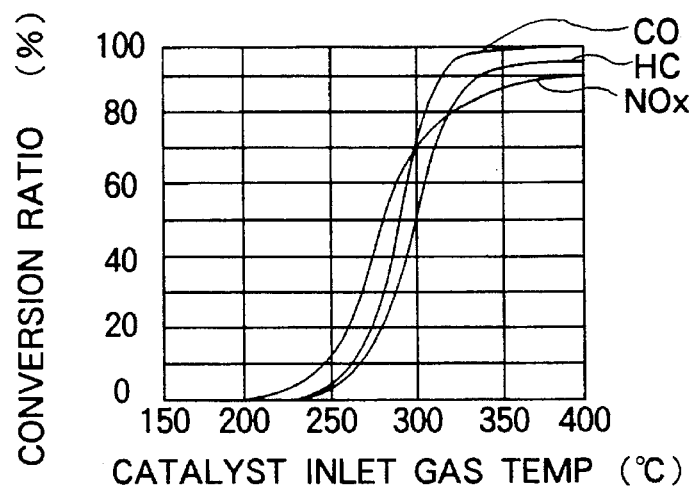
FIG. 8 is a view for graphically illustrating relations between catalyst entrance temperatures and conversion ratios.

In operation of the exhaust gas purification apparatus according to the instant embodiment, the fresh air tapped from the intake pipe 2 is pressurized by the air pump 7A driven by a power derived from the output shaft of the engine in response to or under control of the pump control signal S2 supplied from the controller 12A, to be fed to the exhaust pipe 5 and hence to the catalytic converter 6 via the pipe 8 and the check valve 9. In that case, the heater 11 is actuated in response to the heating control signal S1 generated by the controller 12A, as a result of which the fresh air introduced through the fresh air pipe 8 and flowing through the heater 11 is heated to a high temperature on the order of 300° C., for example. The air thus heated and carrying oxygen molecules activated thereby undergoes reaction with noxious components such as hydrocarbon (HC) and carbon monoxide (CO) contained in the exhaust gas with a high efficiency within the catalytic converter 6, thereby converting them to harmless components such as $H_2O$ and $CO_2$. In this way, purification of the exhaust gas can be realized with an enhanced efficiency. It has experimentally been determined that when the gas temperature is increased to ca. 400° C. at the entrance of the catalytic converter 6, the gas component CO is converted to harmless component ($CO_2$) at as high a conversion ratio as 100%, as is illustrated in FIG. 8.

Embodiment 2

In the case of the first embodiment of the invention, the air fed to the fresh air introducing pipe 8 is heated constantly. In this conjunction, it is generally known that the combustion state of the air-fuel mixture within the engine 1 differs between a time point immediately succeeding to the start of the engine operation and a time point after lapse of a given time therefrom, which means that the contents of noxious components of the exhaust gas differ correspondingly. Besides, the activity state or level of oxygen molecules in the fresh air differs in dependence on the temperature level of the catalytic converter 6 which is affected by the temperature or other factor of the exhaust gas. For these reasons, it is preferred to feed the fresh air into the fresh air introducing pipe 8 and heat the air at an earlier stage of the engine operation in which contents of the noxious components in the exhaust gas are high and in which the catalytic converter 6 is not yet warmed up sufficiently. By adopting such control procedure, reaction taking place between the fresh air and the exhaust gas can correspondingly be promoted.

The control to this end can be realized by designing or programming the controller 12A such that the heater 11 is electrically energized during a given period immediately after the start of the engine operation or alternatively such that the time or period for which the heater 11 is actuated can be set at an optimum value in dependence on the type of the catalyst actually employed in the catalytic converter.

Embodiment 3

Figure 2:
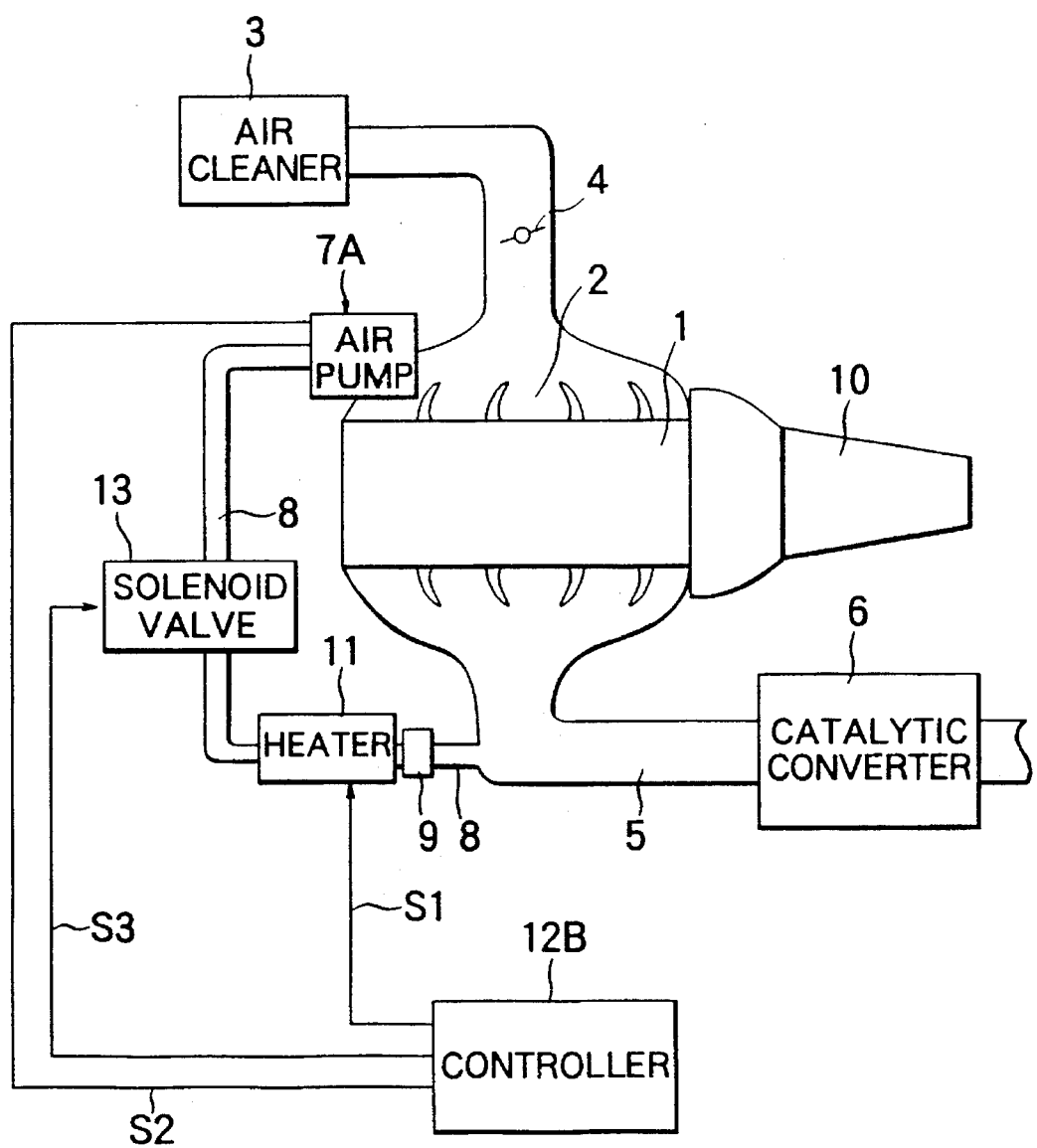
FIG. 2 is a view similar to FIG. 1 and shows an internal combustion engine equipped with an exhaust gas purification system according to another embodiment of the invention.

FIG. 2 is a diagram showing generally a structure of the fresh air introducing apparatus for an internal combustion engine according to a third embodiment of the present invention. In this figure, same or equivalent parts as those shown in FIG. 1 are denoted by like reference numerals. In the case of this apparatus, a solenoid valve 13 constituting the airflow adjusting means is installed in the fresh air introducing shunt pipe 8 at a location upstream of the heater 11 for the purpose of adjusting the amount or flow rate of the fresh air to be directed to the catalytic converter. A controller 12B constituting the control means in the system according to the instant embodiment of the invention is so implemented that it generates a valve control signal S3 for controlling the degree of opening of the solenoid valve 13 in addition to the heating control signal S1 for controlling the operation of the heater 11 and the pump control signal S2 for controlling operation of the air pump 7A.

In operation of the apparatus according to the instant embodiment, the fresh air is fed to the heater 11 via the air pump 7A and the fresh air introducing shunt pipe 8. The air heated by the heater 11 is then directed into the exhaust pipe 5. As described previously, the fresh air taken in from the ambient or the intake pipe is pressurized by the air pump 7A operated under the control of the pump control signal S2 to be thereby charged into the fresh air introducing pipe 8. The air charged in this manner flows through or over the heater 11 at a flow rate controlled by the solenoid valve 13 whose opening degree is controlled by the valve control signal S3 supplied from the controller 12B.

As mentioned previously, at an earlier stage of the engine operation, the catalytic converter 6 is neither warmed nor activated sufficiently. Accordingly, at this earlier stage of the engine operation, the solenoid valve 13 is opened sufficiently wide for a predetermined temporal duration to thereby introduce an increased but constant amount of heated fresh air into the exhaust pipe 5 and hence to the catalytic converter 6 in order to activate the catalytic converter 6 sufficiently high at the earliest possible time point after the start of engine operation. The control of the fresh air flow mentioned above may be performed by taking into account such a relation between the air flow as introduced and the time lapse as illustrated in FIG. 3A. Subsequently, the degree of opening of the solenoid valve 13 is varied periodically by the valve control signal S3 outputted from the controller 12B to thereby decrease repetitively the amount of fresh air introduced into the exhaust pipe 5 in such a manner as shown in FIG. 3B.

At this juncture, it has experimentally been established that in the state where the catalytic converter 6 is sufficiently warmed up and activated, repetitive variation (i.e., increase and decrease) of the introduced air flow as shown in FIG. 3B is more effective in promoting the catalytic reaction, when compared with the introduction of the fresh air in a constant flow or amount as illustrated in FIG. 3B. Thus, with the structure of the exhaust gas purification apparatus according to the third embodiment of the invention, oxidization reaction performed with the aid of the catalyst is activated by supplying the heated fresh air in the repetitively varying amount or flow rate, whereby the quantity of heat generated by the catalyst is increased to thereby raise the temperature of the catalytic converter, as a result of which the reaction for purification of the exhaust gas is correspondingly enhanced. It goes without saying that the amount or flow rate of the fresh air as introduced can be so determined as to be optimal in dependence on the type of the catalyst employed in the catalytic converter 6.

Embodiment 4

In the case of the exhaust gas purification apparatus according to the third embodiment of the invention, there may arise such situation in which the electric energization control signal for the heater 11 and the control signals for controlling operations of the air pump 7A and the solenoid valve 13, respectively, are outputted simultaneously upon starting the engine operation, as can be seen in a timing chart of FIG. 4. Additionally, when the control signals for the air pump 7A and the solenoid valve 13, respectively, are outputted in synchronism upon start of the engine operation, it may occur that the heated air is inhibited from being introduced into the exhaust pipe 5 and the catalytic converter 6 for a period immediately after the engine is started, because the heater 11 is not sufficiently heated at this time point. In these cases, the exhaust gas will be prevented from being activated due to lowering in the temperature thereof as brought about by the contact with the fresh air of normal or low temperature. Further, the temperature rise of the catalytic converter 6 to the level for the purification is accompanied with a significant time lag, rendering insufficient the activation of the catalyst. Under the circumstances, efficiency of purification of the exhaust gas discharged during an initial phase of engine operation which immediately follows the engine start and having high contents of hydrocarbon (HC) and carbon monoxide (CO) may be lowered, to a disadvantage.

Accordingly, it is taught by the present invention incarnated in the instant embodiment to energize electrically the heater 11 before feeding the fresh air thereto, for thereby accelerating the temperature rise of the heater 11 while protecting the latter against cooling action exerted by the fresh air of a low temperature and allowing the fresh air to be fed to the heater 11 having the temperature raised to a sufficiently high level. Thus, with the apparatus according to the instant embodiment, it is possible to introduce the fresh air of a sufficient high temperature into the exhaust pipe 5 even during a period which succeeds immediately to the start of the engine operation. To this end, the heater 11 is first electrically energized in precedence to the start of the engine operation, which is then followed by actuation of the air pump 7A and the solenoid valve 11, so that the fresh air heated to a sufficiently high temperature is introduced to thereby warm up the catalytic converter 6 previously or preparatorily for the purpose of enhancing or promoting the exhaust gas purifying operation of the catalytic converter 6.

Figure 5:
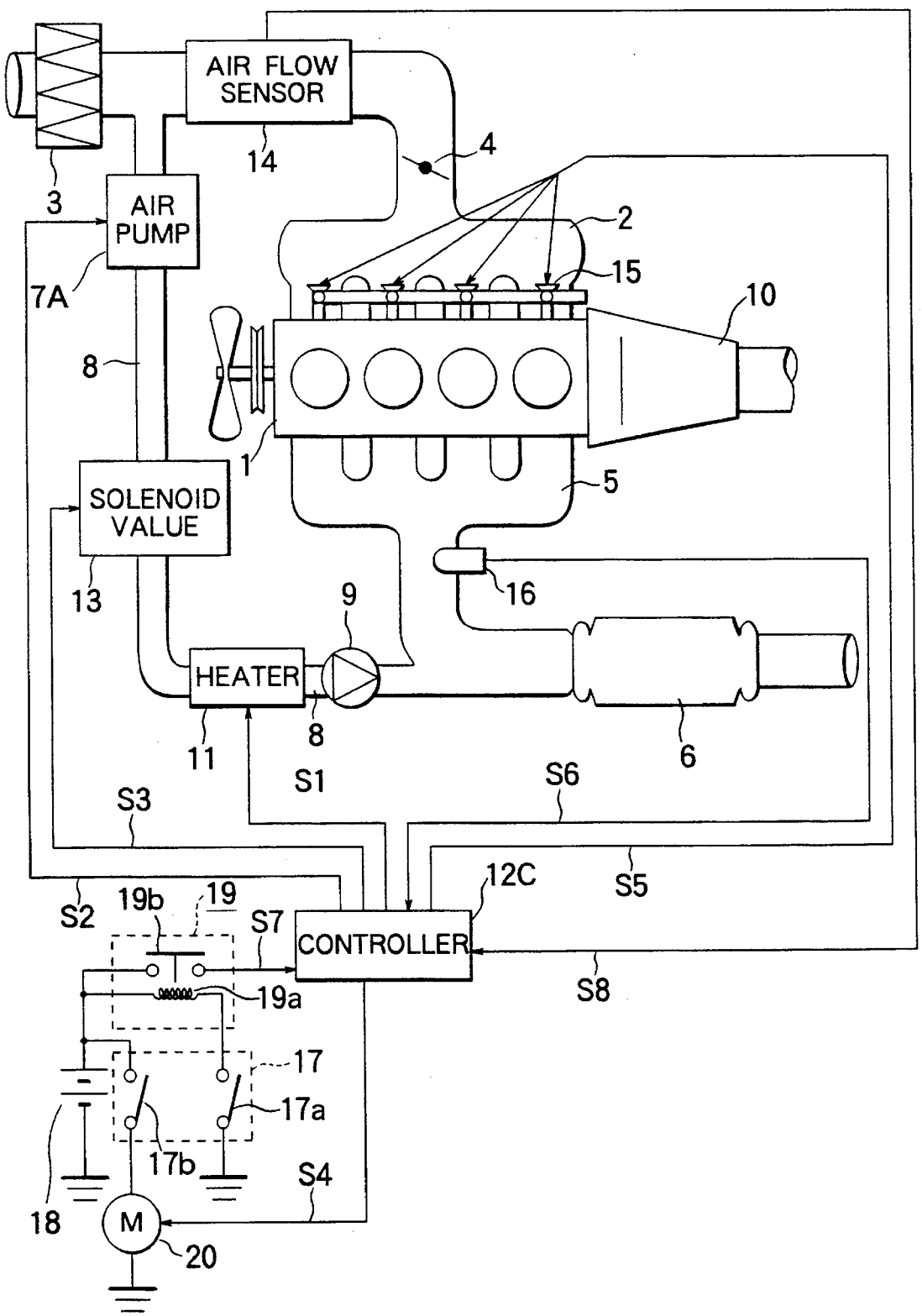
FIG. 5 is a diagram showing an internal combustion engine equipped with the exhaust gas purification system according to yet another embodiment of the invention.

FIG. 5 is a diagram showing generally a structure of the exhaust gas purification apparatus according to the fourth embodiment of the invention. In this figure, the same or like components as those shown in FIG. 2 are denoted by like reference symbols, and repeated description of these components is omitted. Referring to FIG. 5, a controller 12C which serves as the control means is so designed or programmed that the heater 11 is electrically energized before the engine 1 is started and subsequently the air pump 7A and the solenoid valve 13 are operated after lapse of a predetermined time from the electrically energization of the heater 11, to thereby ensure introduction of the fresh air of a sufficiently high temperature into the exhaust pipe 5. For realizing the control intended with the instant embodiment, there are provided an air flow sensor 14 for measuring the amount or flow rate of air charged in the engine 1 and an $O_2$-sensor 16 for detecting the concentration of oxygen contained in the exhaust gas discharged from the engine for determining the air-fuel ratio of the gas mixture undergone the combustion within the engine 1. As the $O_2$-sensor 16, there may be mentioned a zirconia $O_2$-sensor, a titania $O_2$-sensor or the like employed conventionally. A reference numeral 15 denotes a fuel injector mounted in the intake pipe 2. Further, a reference numeral 17 denotes a key switch for turning on/off an ignition circuit (not shown). A contact 17a constituting a part of the key switch 17 is grounded at one end, while one end of other contact 17b interlocked with the contact 17a is connected to one end of a starter motor 20 which has the other end grounded. A control relay 19 includes a relay coil 19a having one end connected to the other end of the contact 17a with the other end of the coil 19a being connected to the above-mentioned one end of the contact 17b. The control relay 19 includes a relay contact 19b which is adapted to be closed by the relay coil 19a and has one end connected to an input terminal of the controller 12C, while the other end of the relay contact 19b is connected to an electrode of plus polarity of a battery 18 and to the other end of the relay coil 19b to which the contact 17b is connected. Parenthetically, the starter motor is operated in response to a motor control signal S4 issued by the controller 12C after having applied with a source voltage from the battery 18.

Next, operation of the controller 12C will be elucidated before entering into description of operation of the exhaust gas purification apparatus according to the instant embodiment. The controller 12C is so designed or programmed as to output the heating control signal S1 for energizing electrically the heater 11 after having received an ignition (IG) signal S7 inputted through the relay contact 19b of the control relay 19 closed by turn-on operation of the key switch 17. After lapse of a predetermined time, the pump control signal S2 and the solenoid control signal S3 are outputted for actuating the air pump 7A and the solenoid valve 13, respectively.

Besides, the controller 12C performs additional control functions mentioned below.
(1) A basic fuel injection pulse width is determined on the basis of a detection signal S8 outputted from the air flow sensor 14 and indicating the intake air flow rate as detected by that sensor 14 and an engine rotation speed (rpm) derived from the rotation speed (rpm) of a crank shaft (not shown), whereon the basic fuel injection pulse width thus determined is corrected by taking into account temperatures of cooling water and the sucked air as well as the air-fuel ratio determined on the basis of the sensor signal S6 outputted from the $O_2$-sensor 16, to thereby output a drive signal S5 for driving the fuel injector 15. This control function is referred to as the engine operation control function.
(2) An ignition timing signal is outputted to an ignition coil (not shown) for applying a high voltage to a spark plug (not shown either) to thereby control the ignition. This function is referred to as the ignition control function.
(3) A rotation speed feedback control function for controlling the rotation speed (rpm) in an idling operation mode.

Accordingly, the controller 12C is imparted with an air charge control function and a fuel control function.

Figure 6:
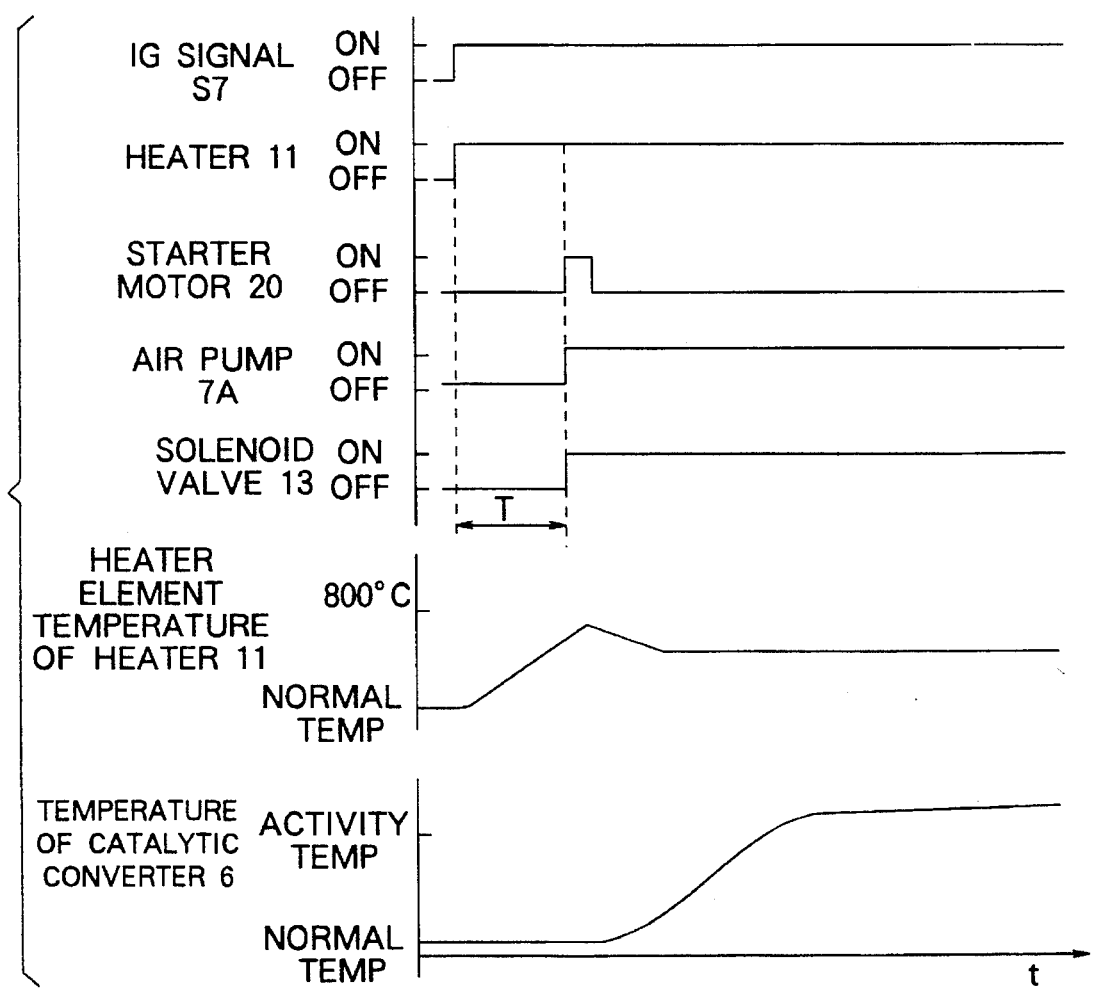
FIG. 6 is a timing chart for illustrating control operation of a controller incorporated in the system shown in FIG. 5.

Now, description will turn to operation of the exhaust gas purification apparatus according to the instant embodiment of the invention. FIG. 6 is a signal waveform diagram for graphically illustrating control timings useful for elucidating the operation for controlling the purification of the exhaust gas together with a relation in temperature rise between the heater 11 and the catalytic converter 6. Referring to FIG. 6, the ignition signal S7 changing from level of "OFF" to "ON" indicates that the control relay 19 is closed in response to turning-on of the key switch 17. The heater 11 is electrically energized (i.e., assumes the level "ON") in response to the heater control signal S1 generated by the controller 12C. Further, it can be seen that the starter motor 20 is electrically energized (i.e. it assumes a level "ON") when a predetermined time T has elapsed from a time point a starter switch (not shown) was turned on by the key switch 17. Furthermore, it is shown that the air pump 7A and the solenoid valve 30 are actuated simultaneously with actuation of the starter motor 20.

More specifically, referring to FIG. 6, when the key switch 17 is turned on with the contact 17a being thereby closed, an excitation current flows through the relay coil 19a, following a current flow path extending from the plus electrode of the battery 18 to the ground through the relay coil 19a and the contact 17a, whereby the relay contact 19b is closed. As a result of this, the ignition (IG) signal S7 is supplied to the controller 12C through the relay contact 19b. Operation of the controller 12C is thus started. Parenthetically, it is noted that when the key switch 17 is turned on, the contact 17b is closed, whereby a voltage is applied across the starter motor 20 from the battery 18. However, at this time point, the starter motor 20 can not operate yet, since the motor control signal S4 is not issued from the controller 12C.

The controller 12C starts to count the time lapse from the time point when the heater control signal S1 is outputted for electrically energizing the heater 11 by making use of the timer function incorporated in the controller 12C. When the count has attained a preset value K, or when the predetermined time T mentioned above has elapsed, to say in another way, the controller 12C issues the motor control signal S4 to the starter motor 20. In response to this signal S4, the starter motor 20 operates to thereby start the engine operation. Besides, the controller 12C responds to the lapse of the aforementioned predetermined time T by issuing the pump control signal S2 for operating the air pump 7A and the valve control signal S3 for actuating the solenoid valve 13.

In this manner, the electrical energization of the heater 11 is started before starting the engine operation and the fresh air introducing operation, to thereby raise the temperature of a heating element of the heater 11 beforehand. Consequently, when the air pump 7A and the solenoid valve 13 are actuated simultaneously with the start of the engine operation, the fresh air is necessarily fed into the heater 11 of a high temperature, as a result of which the temperature of the fresh air is caused to increase instantaneously. The fresh air thus heated to a sufficiently high temperature is introduced to the exhaust pipe 5 and hence to the catalytic converter 6 via the check valve 9. The air of high temperature brought to contact with the catalytic converter 6 naturally heats the latter, which can thus attains an activity temperature of the catalyst within a short time span after the start of the engine operation. In this way, the proportions of hydrocarbon (HC) and carbon monoxide discharged to the atmosphere can significantly be decreased even immediately after the start of operation of the engine 1 by virtue of the promoted or enhanced exhaust gas purification efficiency.

As will now be understood from the above description, according to the instant embodiment of the invention, the fresh air of a sufficiently raised temperature can be introduced into the exhaust pipe 7 immediately in succeeding to the start of engine operation. Thus, not only the exhaust gas is prevented from being lowered in temperature thereof but also the catalytic converter 6 can be warmed up already at an earliest stage of the engine operation. Besides, since the catalytic converter 6 is supplied with air of a high temperature, reaction for oxidizing the noxious components such as hydrocarbon (HC) and carbon monoxide contained in the exhaust gas can be accelerated. It is further noted that heat generated by the oxidization reaction in turn contributes to increase of temperature of the catalytic converter 6, which thus can soon attain the activity temperature for purifying satisfactorily the exhaust gas. In summary, owing to the teachings of the invention incarnated in the instant embodiment, the exhaust gas purification efficiency can significantly be improved.

Figure 9:
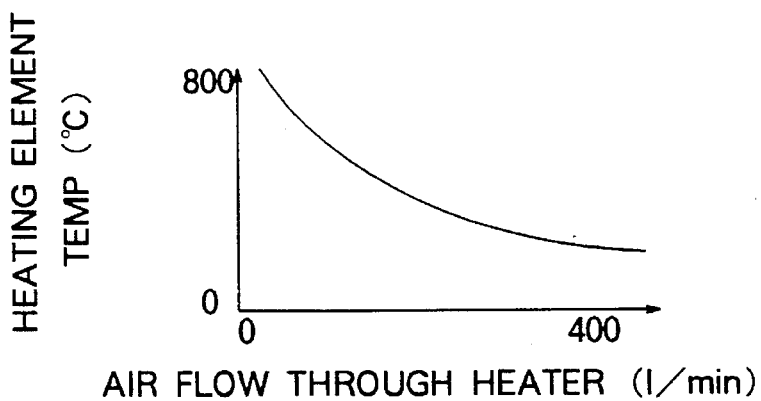
FIG. 9 is a view for graphically illustrating a relation between a flow rate of air passing through a heating means and a heat radiating element temperature.
Figure 10:
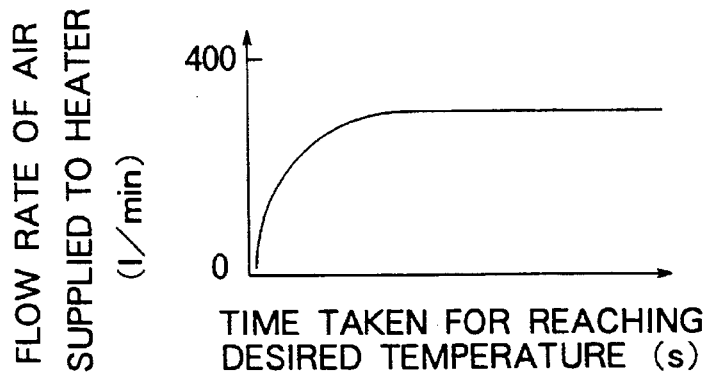
FIG. 10 is a view for graphically illustrating a relation between the time taken for the air to attain a desired temperature and an amount of air supplied to a heater.

FIG. 9 graphically illustrates a relation between a flow rate of air passing through the heater 11 and a temperature which the heating element can reach (hereinafter referred to as the heater element temperature). As can be seen in this figure, when the air flow rate through the heater is zero (l/min), the heater element temperature (°C.) of the heater 11 can instantaneously rise to about 800° C. Additionally, it can be seen from FIG. 10 that as the amount of the air supplied to the heater 11 increases, the time taken for the heater 11 to attain a desired or target temperature becomes longer. For these reasons, it is preferred for raising the temperature of the heater 11 to a desired level as soon as possible to heat the heater 11 from the state not cooled by the air by setting the air flow rate through the heater 11 to zero (l/min).

Embodiment 5

Figure 7:
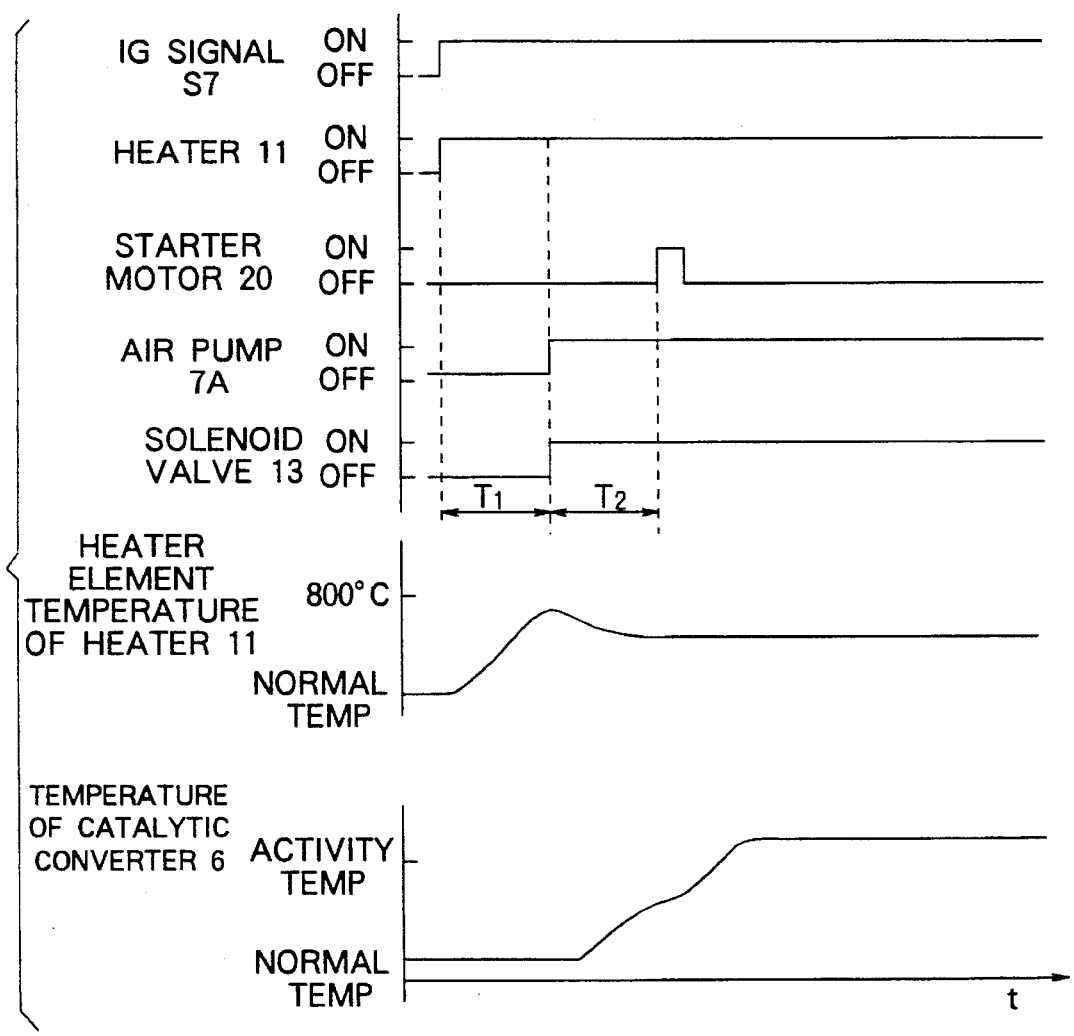
FIG. 7 is a timing chart similar to FIG. 6 for illustrating controls adopted in a system according to a further embodiment of the invention.

In the case of the apparatus according to the fourth embodiment of the invention, control is so performed that the air pump 7A and the solenoid valve 13 are actuated to start the fresh air introduction into the exhaust pipe simultaneously with the start of the engine operation at a time point when a preset time has elapsed from the start of electric energization of the heater 11. It should however be understood that the control may equally be so performed that the heater 11 is first electrically energized, which is then followed by actuation of the air pump 7A and the solenoid valve 13, whereafter the starter motor 20 is operated to start the operation of the engine 1, as is shown in FIG. 7.

The fifth embodiment is directed to the control procedure mentioned above. More specifically, referring to FIG. 7, when the key switch 17 is turned on with the contact 17a being thereby closed, an excitation current flows through the relay coil 19a, following a current flow path extending from the plus electrode of the battery 18 to the ground through the relay coil 19a and the contact 17a, whereby the relay contact 19b is closed. As a result of this, the ignition (IG) signal S7 is supplied to the controller 12C through the relay contact 19b. Operation of the controller 12C is thus started. Parenthetically, it is noted that when the key switch 17 is turned on, the contact 17b is closed, whereby a voltage is applied across the starter motor 20 from the battery 18. However, at this time point, the starter motor 20 can not operate yet, since the motor control signal S4 is not issued form the controller 12C.

The controller 12C starts to count the time lapse form the time point when the heater control signal S1 is outputted for electrically energizing the heater 11 by making use of the timer function incorporated in the controller 12C. When the count has attained a preset value K or when the predetermined time T mentioned above has elapsed, to say in another way, the controller 12C issues the pump control signal S2 for operating the air pump 7A and the valve control signal S3 for actuating the solenoid valve 13.

Subsequently, the controller 12C counts the time lapse from the time point when the introduction of the fresh air was started. When the count has attained a predetermined value $K_2$ or when a predetermined time $T_2$ has lapsed from that time point, the controller 12C issues the motor control signal S4 for the starter motor 20 to thereby start the engine operation. By delaying the operation timing for the starter motor 20 relative to the timing for the fresh air introduction, air of high temperature is fed to the catalytic converter 6 before the engine operation is started, to thereby warm up the catalytic converter. Thus, the exhaust gas purification can be effectuated with a maximum efficient, starting from the time point immediately after the start of engine operation.

Embodiment 6

In conjunction with the fifth embodiment, it has been described that the preset times T, $T_1$ and $T_2$ are determined by counting these times by a counter incorporated in the controller 12C. According to the instant embodiment, it is proposed to change these preset times T, $T_1$ and $T_2$ by taking into account the engine cooling water temperature, the ambient temperature, atmospheric pressure for realizing more fine and accurate control as aimed.

Embodiment 7

In the case of the third embodiment, the degree of opening of the solenoid valve 13 is periodically controlled at a predetermined time interval to vary the fresh air flow periodically. According to the instant embodiment, it is proposed to modulate fresh air flow by correspondingly controlling the air flow through the air pump which is then constituted by a displacement variable type air pump. In this case, the solenoid valve 13 may be spared, to an advantage from the economical viewpoint.

Embodiment 8

In the case of the fourth and fifth embodiments, the ignition (IG) signal S7 is generated to be supplied to the controller 12C simultaneously with the turn-on of the control relay 19. However, for generation of the IG signal S7, any appropriate signal supply circuit may be employed so far as the aimed function can thereby be realized.

Embodiment 9

The controllers 12A, 12B and 12C described in the forgoing has been assumed to be so designed or programmed as to control the electric energization of the heater 1 in response to the heating control signal. In this conjunction, it is proposed according to the instant embodiment to control the electric energization in dependence on the engine state, the ambient temperature, the atmospheric pressure and the like for realizing the more accurate control. It should be mentioned that such control can be implemented by resorting to the techniques known in the art.

Many features and advantages of the present invention are apparent form the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

We claim:

1. In an exhaust gas purification system for an internal combustion engine having an exhaust gas pipe in which a catalytic converter is installed for purification of an exhaust gas discharged from said engine, an apparatus for introducing fresh air into said exhaust pipe of said engine, comprising:

a fresh air introducer disposed between an air intake pipe of said internal combustion engine and said exhaust gas pipe and for introducing fresh air into said exhaust gas pipe and hence to said catalytic converter, said fresh air introducer being constituted by a shunt pipe having one end communicated to said air intake pipe and an other end communicated to said exhaust gas pipe of said engine at a location upstream of said catalytic converter;

an electrically energizable heater for heating said fresh air introduced through said fresh air introducer; and an electric controller for controlling operation of said electrically energizable heater in dependence on at least one of operation states of said internal combustion engine and ambient conditions, wherein said electrically energizable heater is installed in said shunt pipe, and wherein said electric controller is designed to energize electrically said electrically energizable heater for a period of a predetermined duration immediately after said engine operation has been started.

2. An air introducing apparatus according to claim 1, wherein said duration of said predetermined period is determined on the basis of the type of catalyst employed in said catalytic converter.

3. An air introducing apparatus according to claim 1, wherein said electric controller is designed to energize electrically said electrically energizable heater before said engine is operated and before said fresh air is introduced into said exhaust pipe.

4. An air introducing apparatus according to claim 3, wherein said electric controller includes a counter for counting a time elapsing from a time point when said electrically energizable heater is electrically energized, and means for activating starter means for starting operation of said engine when said counter has attained a predetermined value.

5. An air introducing apparatus according to claim 4, wherein said predetermined value is determined in dependence on at least one of operation state of said engine, temperature of said engine, ambient temperature and atmospheric pressure.

6. In an exhaust gas purification system for an internal combustion engine having an exhaust gas pipe in which a catalytic converter is installed for purification of an exhaust gas discharged from said engine, an apparatus for introducing fresh air into said exhaust pipe of said engine, comprising:

fresh air introducing means disposed between an air intake pipe of said internal combustion engine and said exhaust gas pipe for introducing fresh air into said exhaust gas pipe and hence to said catalytic converter, said fresh air introducing means being constituted by a shunt pipe having one end communicated to said air intake pipe and an other end communicated to said exhaust gas pipe of said engine at a location upstream of said catalytic converter;

air flow regulating means for regulating a flow rate of said fresh air fed to said fresh air introducing means;

heating means for heating said fresh air introduced through said fresh air introducing means; and control means for controlling operations of said heating means and said air flow regulating means in dependence on at least one of operation states of said internal combustion engine and ambient conditions, wherein said heating means is installed in said shunt pipe, and said flow regulating means is installed in said shunt pipe at a location upstream of said heating means.

7. An air introducing apparatus according to claim 6, wherein said heating means includes an electrically energizeable heater, said air flow regulating means includes an electrically controlled valve, and said control means is constituted by an electric controller, and wherein said control means is designed to energize electrically said heating means and open said electrically controlled valve for a period of a predetermined duration immediately after said engine operation has been started.

8. An air introducing apparatus according to claim 7, wherein said duration of said predetermined period is determined on the basis of the type of catalyst employed in said catalytic converter.

9. An air introducing apparatus according to claim 7, wherein said control means is designed to energize electrically said heating means before opening said solenoid valve.

10. An air introducing apparatus according to claim 7, wherein said control means is designed to control said flow regulating means in such a manner in which flow of said fresh air fed through said shunt pipe and heated by said heating means is maintained at a constant flow rate for a first period of a predetermined duration immediately succeeding to the start of operation of said engine while said flow of said fresh air varies repetitively at a periodic interval after elapse of said first period.

11. An air introducing apparatus according to claim 7, wherein said control means includes a counter for counting a time elapsing from a time point when said heating means is electrically energized, and means for activating said flow regulating means for allowing the fresh air to be fed through said shunt pipe when said counter has attained a predetermined value.

12. An air introducing apparatus according to claim 11, wherein said predetermined value is determined in dependence on at least one of operation state of said engine, temperature of said engine, ambient temperature and atmospheric pressure.

13. In an exhaust gas purification system for an internal combustion engine having an exhaust gas pipe in which a catalytic converter is installed for purification of an exhaust gas discharged from said engine, an apparatus for introducing fresh air into said exhaust pipe of said engine, comprising:

fresh air introducing means disposed between an air intake pipe of said internal combustion engine and said exhaust gas pipe for introducing fresh air into said exhaust gas pipe and hence to said catalytic converter;

air flow regulating means for regulating a flow rate of said fresh air fed to said fresh air introducing means;

heating means for heating said fresh air introduced through said fresh air introducing means;

starter means for starting operation of said internal combustion engine; and control means for controlling operations of said heating means, said air flow regulating means and said starter means such that said heating means is first activated, which is then followed by activation of said air flow regulating means, and finally said starter means is actuated for starting operation of said engine.

14. An air introducing apparatus according to claim 13, wherein duration of a period for which said heating means is activated is determined on the basis at least one of the type of a catalyst employed in said catalytic converter, ambient conditions and atmospheric pressure.

15. An air introducing apparatus according to claim 13, wherein said control means is designed to control said flow regulating means in such a manner in which flow of said fresh air fed through said shunt pipe and heated by said heating means is maintained at a constant flow rate for a first period of a predetermined duration immediately succeeding to the start of operation of said engine while said flow of said fresh air varies repetitively at a periodic interval after elapse of said first period.

16. In an exhaust gas purification system for an internal combustion engine having an exhaust gas pipe in which a catalytic converter is installed for purification of an exhaust gas discharged from said engine, an apparatus for introducing fresh air into said exhaust pipe of said engine, comprising:

fresh air introducing means disposed between an air intake pipe of said internal combustion engine and said exhaust gas pipe for introducing fresh air into said exhaust gas pipe and hence to said catalytic converter, said fresh air introducing means being constituted by a shunt pipe having one end communicated to said air intake pipe and an other end communicated to said exhaust gas pipe of said engine at a location upstream of said catalytic converter;

heating means for heating said fresh air introduced through said fresh air introducing means; and control means for controlling operation of said heating means in dependence on at least one of operation states of said internal combustion engine and ambient conditions, wherein said heating means is installed in said shunt pipe and includes an electrically energizable heater, while said control means is constituted by an electric controller, and wherein said control means is designed to energize electrically said heating means for a period of a predetermined duration immediately after said engine operation has been started.

17. In an exhaust gas purification system for an internal combustion engine having an exhaust gas pipe in which a catalytic converter is installed for purification of an exhaust gas discharged from said engine, an apparatus for introducing fresh air into said exhaust pipe of said engine, comprising:

fresh air introducing means disposed between an air intake pipe of said internal combustion engine and said exhaust gas pipe for introducing fresh air into said exhaust gas pipe and hence to said catalytic converter, said fresh air introducing means being constituted by a shunt pipe having one end communicated to said air intake pipe and an other end communicated to said exhaust gas pipe of said engine at a location upstream of said catalytic converter;

air flow regulating means for regulating a flow rate of said fresh air fed to said fresh air introducing means;

heating means for heating said fresh air introduced through said fresh air introducing means; and control means for controlling operations of said heating means in dependence on at least one of operation states of said internal combustion engine and ambient conditions, wherein said heating means is installed in said shunt pipe, and said flow regulating means is installed in said shunt pipe at a location upstream of said heating means, and further wherein said heating means includes an electrically energizable heater, said air flow regulating means includes an electrically controlled valve, and said control means is constituted by an electric controller, said control means being operative to energize electrically said heating means and open said electrically controlled valve for a period of a predetermined duration immediately after said engine operation has been started.

* * * * *